United States Patent
Xu et al.

(10) Patent No.: US 12,167,257 B2
(45) Date of Patent: Dec. 10, 2024

(54) METHOD FOR ADJUSTING ANTENNA STATE OF WIRELESS AP, SMART ANTENNA SCHEDULING METHOD AND WIRELESS AP

(71) Applicant: TP-LINK CORPORATION LIMITED, Hong Kong (CN)

(72) Inventors: Zhen Xu, Chengdu (CN); Xia-Na Lin, Chengdu (CN); Bin He, Chengdu (CN); Yanjie Cao, Chengdu (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/412,483

(22) Filed: Jan. 13, 2024

(65) Prior Publication Data

US 2024/0155380 A1     May 9, 2024

Related U.S. Application Data

(63) Continuation of application No. 18/568,271, filed as application No. PCT/CN2023/092491 on May 6, 2023, now abandoned.

(30) Foreign Application Priority Data

May 9, 2022 (CN) .......................... 202210503280.2

(51) Int. Cl.
*H04W 24/02* (2009.01)
*H01Q 3/04* (2006.01)
*H04W 88/08* (2009.01)

(52) U.S. Cl.
CPC .............. *H04W 24/02* (2013.01); *H01Q 3/04* (2013.01); *H04W 88/08* (2013.01)

(58) Field of Classification Search
CPC ......... H04L 47/50; H04B 7/0617; H01Q 3/04
USPC .................................. 370/329; 375/267, 295
See application file for complete search history.

(56) References Cited

U.S. PATENT DOCUMENTS

| | | | |
|---|---|---|---|
| 2014/0086206 A1* | 3/2014 | Miyata | H04W 72/0446 370/330 |
| 2021/0314917 A1* | 10/2021 | Lee | H04W 72/02 |
| 2022/0260625 A1* | 8/2022 | Gao | G01R 29/105 |

FOREIGN PATENT DOCUMENTS

| | | |
|---|---|---|
| CN | 108092702 A | 5/2018 |
| CN | 108541026 A | 9/2018 |
| CN | 111726816 A | 9/2020 |
| CN | 114268936 A | 4/2022 |
| CN | 115119231 A | 9/2022 |

* cited by examiner

*Primary Examiner* — Kiet M Doan
(74) *Attorney, Agent, or Firm* — Loeb & Loeb LLP

(57) ABSTRACT

The present disclosure discloses a method for adjusting antenna state of a wireless AP, an smart antenna scheduling method and a wireless AP, wherein the method includes: acquiring a performance index of an antenna of a wireless AP in a current antenna state, wherein the performance index is a weighted average of negotiated rates of a plurality of clients communicably connected with the wireless AP; and adjusting the antenna state of the antenna based on the performance index of the antenna of the wireless AP in the current antenna state.

7 Claims, 3 Drawing Sheets

METHOD FOR ADJUSTING ANTENNA STATE OF WIRELESS AP, SMART ANTENNA SCHEDULING METHOD AND WIRELESS AP

CROSS-REFERENCE TO RELATED APPLICATION

This application is a continuation of U.S. application Ser. No. 18/568,271, filed on Dec. 7, 2023, which is a national phase filing of International Application No. PCT/CN2023/092491, filed on May 6, 2023, which claims the priority to and benefits of priority of China Patent Application No. 202210503280.2 filed on May 9, 2022. All the aforementioned patent applications are hereby incorporated by reference in their entireties.

TECHNICAL FIELD

The present disclosure belongs to the technical field of communication, and particularly, relates to a smart antenna scheduling method and apparatus, a wireless AP and a computer storage medium.

BACKGROUND

With the continuous advancement of WiFi technology, the rapid improvement in WiFi physical layer rates has also driven the swift development of smart antenna technology. Smart antenna technology mainly includes two technical paths: one is to improve the design of smart antenna hardware, and the other is to improve the method of smart antenna scheduling. The smart antenna scheduling method will directly affect the actual benefits that smart antennas bring to the system.

However, the traditional smart antenna scheduling method not only requires the adaptability and compatibility between wireless AP and terminal, but also needs to provide extra channel cost, leading to high overhead for hardware power consumption and heavy burden for network. Therefore, it is necessary to further improve the smart antenna scheduling method.

SUMMARY

The embodiments of the present disclosure are proposed to solve the problems that the traditional smart antenna scheduling method requires relatively high adaptability and compatibility between wireless AP and terminal, with high channel cost, high overhead for hardware power consumption, heavy burden for network, etc. Of course, the embodiments of the present disclosure are not limited to this.

In order to achieve the above objectives, in a first aspect, the present disclosure provides a smart antenna scheduling method, comprising: acquiring a performance index of an antenna of a wireless AP in a current antenna state, wherein the performance index is a weighted average of negotiated rates of a plurality of clients communicably connected with the wireless AP; and adjusting the antenna state of the antenna based on the performance index of the antenna of the wireless AP in the current antenna state.

In order to achieve the above objectives, in a second aspect, the present disclosure provides a smart antenna scheduling method, comprising: configuring a plurality of antenna states for a smart antenna; calculating a plurality of weighted averages corresponding to the plurality of antenna states by utilizing a preset method, wherein the plurality of antenna states correspond to the plurality of weighted averages one by one, and the weighted average is a weighted average of negotiated rates of all clients of the wireless AP corresponding to the smart antenna; and determining a target weighted average based on the plurality of weighted averages; and selecting an antenna state corresponding to the target weighted average as the target antenna state.

In one possible implementation, calculating a plurality of weighted averages corresponding to the plurality of antenna states by utilizing a preset method comprises: calculating weighted average corresponding to each antenna state of the plurality of antenna states by utilizing the preset method; collecting weighted average corresponding to each antenna state to obtain the plurality of weighted averages.

In one possible implementation, calculating a plurality of weighted averages corresponding to the plurality of antenna states by utilizing a preset method comprises: determining, for each antenna state, negotiated rate of each client of all clients of the wireless AP; and obtaining the weighted average corresponding to all clients based on the negotiated rate and weight of each client.

In one possible implementation, all clients include a first client and a second client; determining negotiated rate of each client of all clients of the wireless AP comprises: configuring a corresponding first negotiated rate for the first client; referencing a roaming database and mapping target data in the roaming database to obtain a second negotiated rate corresponding to the second client; and obtaining the negotiated rates of each client based on the first negotiated rate and the second negotiated rate.

In one possible implementation, obtaining the weighted average corresponding to all clients based on the negotiated rate and weight of each client comprises: determining the weight of each client; and obtaining the weighted average corresponding to all clients based on a quantity of clients and the negotiated rate and weight of each client.

In one possible implementation, determining the weight of each client comprises: determining the negotiated rate of each client under different signal strengths based on the target data; and determining the weight of each client based on the negotiated rates of each client under different signal strengths.

In one possible implementation, determining a target weighted average based on the plurality of weighted averages comprises: selecting a maximum among the plurality of weighted averages as the target weighted average.

In a third aspect, an embodiment of the present disclosure provides a smart antenna scheduling apparatus, comprising: a configuration module, for configuring a plurality of antenna states for a smart antenna; a weighting calculation module, for calculating a plurality of weighted averages corresponding to the plurality of antenna states by utilizing a preset method, wherein the plurality of antenna states correspond to the plurality of weighted averages one by one, and the weighted average is weighted average of negotiated rates of all clients of the wireless AP corresponding to the smart antenna; a weighted average determination module, for determining a target weighted average based on the plurality of weighted averages; a target antenna state determination module, for selecting an antenna state corresponding to the target weighted average as the target antenna state.

In a fourth aspect, an embodiment of the present disclosure provides a wireless AP comprising a memory, a processor, and a computer program stored in the memory and executable on the processor, wherein the computer program, when executed by the processor, implements steps of any of the above smart antenna scheduling methods.

In a fifth aspect, an embodiment of the present disclosure provides a computer-readable storage medium storing a computer program which, when executed by a processor, implements steps of any of the above smart antenna scheduling methods.

The embodiments of the present disclosure measure the performance of a smart antenna in an antenna state by calculating a weighted average of negotiated rates of all clients of a wireless AP corresponding to the smart antenna, so as to select an optimal antenna state (i.e., target antenna state). This method needs neither to take into account the adaptability and compatibility between wireless AP and terminal, nor to provide extra channel cost, thus avoiding the problems of high overhead for hardware power consumption and heavy burden for network, conveniently implementing smart antenna scheduling, while improving the efficiency thereof. The scheme provided by the present disclosure can play a role in shortening the communication delay of data packets with high requirements for real-time communication, i.e., data packets with the aforementioned preset type, and improving the communication efficiency.

BRIEF DESCRIPTION

In order to illustrate the embodiments of the present disclosure or the technical scheme in the prior art more clearly, the drawings needed to be used in the description of the embodiments or the prior art will be briefly introduced below. Obviously, the drawings in the following description are some embodiments of the present disclosure, and other drawings can be obtained according to these drawings without creative work for ordinary skilled in the art. In the Drawings.

DETAILED DESCRIPTION

Figure 1:
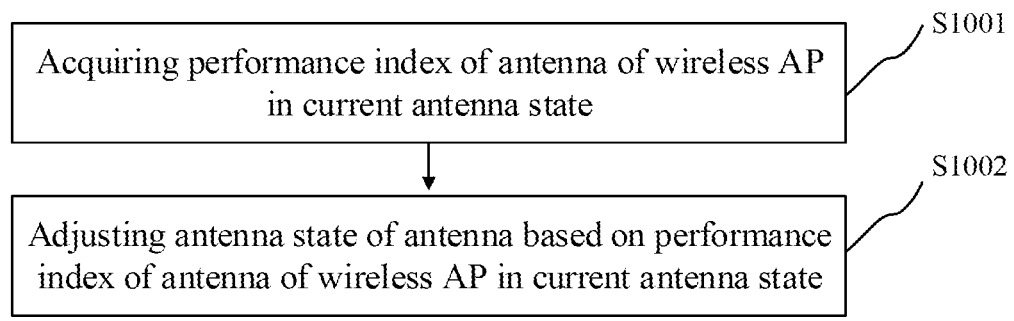
FIG. 1 is an implementation flowchart of a smart antenna scheduling method provided by an embodiment of the present disclosure.

In order to make the purposes, technical schemes and advantages of the embodiments of the present disclosure more clear, a clear and complete description will be made to the technical schemes in the embodiments of the present disclosure in combination with the drawings. Obviously, the described embodiments are merely part of the embodiments of the present disclosure, but not all the embodiments. Based on the embodiments in the present disclosure, all other embodiments obtained by ordinary skilled in this art without creative work belong to the protection scope of the present disclosure.

The terms such as "first", "second", "third", "fourth" etc., in the specification and claims of the present disclosure and the attached drawings, if any, are used to distinguish similar objects, and are not necessarily used to describe a specific order or sequence. It should be understood that the data used as such can be interchanged as appropriate, so that the embodiments of the present disclosure described herein can be implemented in other orders than those illustrated or described herein.

It should be understood that in various embodiments of the present disclosure, the sequence number of each process does not mean an executing order, and the executing order of each process should be determined according to its function and internal logic, and should not constitute any constraints on the implementation process of the embodiments of the present disclosure.

It should be understood that in the present disclosure, "including" and "having" and any variations thereof are intended to cover non-exclusive inclusion, for example, a process, method, system, product or device that contains a series of steps or units is not necessarily limited to those explicitly listed, but may contain other steps or units not explicitly listed or inherent to such process, method, system, product or device.

It should be understood that in the present disclosure, "plurality" means two or more. Further, "and/or" is merely an association describing related objects, meaning that there can be three kinds of associations. For example, "A and/or B" may mean three separate situations: only A, both A and B, and only B. The character "/" generally indicates an "OR" association between the objects therebefore and thereafter. Further, "including A, B and C" and "including A, B, C" refer to including all of A, B and C, "including A, B, or C" refers to including one of A, B and C, and "including A, B, and/or C" refers to including any one or two or three of A, B and C.

It should be understood that in the present disclosure, "B corresponding to A", "A corresponding to B", "A corresponds to B" or "B corresponds to A" means that B is associated with A, and B can be determined according to A. Determining B according to A does not only mean determining B according to A, but also determining B according to A and/or other information. A match between A and B means that the similarity between A and B is greater than or equal to a preset threshold.

Depending on the context, "if" as used herein can be interpreted as "when . . . " or "while . . . " or "in response to determining . . . " or "in response to detecting . . . ".

The technical scheme of the present disclosure will be described in detail with specific examples. The following several specific embodiments can be combined with each other, and the same or similar concepts or processes may not be repeated in some embodiments.

In order to make the purpose, technical scheme and advantages of the present disclosure more clear, illustrations will be made by means of specific embodiments in combination with the drawings.

At present, an implementation of a traditional smart antenna scheduling mechanism is that: a wireless AP (Wi-Fi AP) sends a test frame to the terminal; the terminal feeds back information such as signal-to-noise ratio, RSSI, bit error rate etc., to the wireless AP based on the test frame; and then the wireless AP performs weighting calculation on the above-mentioned information to obtain a comprehensive performance impact factor α, polls various antenna states, and then compares and analyzes magnitudes of comprehensive performance impact factors α respectively corresponding to various antenna states, so as to take an antenna state corresponding to an optimal value of α as a target antenna state.

However, in the above-described smart antenna scheduling mechanism, it is required for the terminal to feed back a large amount of information to the wireless AP in order for the wireless AP to make a determination based on such information. In such a mechanism, relatively high compatibility and adaptability are required between the terminal and the wireless AP in order to complete the communication of such information. Meanwhile, as it is required for the wireless AP to send a test frame without data, extra channel cost and lower data transmission rate will occur.

To this regard, according to various embodiments of the present disclosure, a proposal is made to measure the performance of a smart antenna in an antenna state by calculating a weighted average of negotiated rates of all clients of a wireless AP corresponding to the smart antenna. This enables the selection of an optimal antenna state (i.e., target antenna state). According to the embodiments of the present disclosure, neither the adaptability and compatibility between wireless AP and terminal need to be taken into account, nor extra channel expenditure needs to be provided, thus avoiding the issues of high overhead for hardware power consumption and a heavy burden for network, enabling conveniently implementation of smart antenna scheduling, and improving the efficiency thereof.

In an embodiment according to the present disclosure, as shown in FIG. 1, a method 1000 for adjusting an antenna state of a wireless AP is provided.

In operation S1001, a performance index of an antenna of a wireless AP in a current antenna state is acquired, wherein the performance index is a weighted average of negotiated rates of a plurality of clients communicably connected with the wireless AP.

Optionally, the antenna state refers to the operating state of smart antenna, which is associated with the signal emitting angle of smart antenna. Specifically, it is assumed that the smart antenna has 8 antenna states. These 8 antenna states respectively correspond to 8 angles arranged along the horizontal plane and with a spacing of 45° between adjacent angles. That is, there are 8 antenna states of smart antenna based on 8 signal emitting angles of smart antenna. In addition, the spacing between adjacent signal emitting angles may be a multiple of 45°, specifically, 90°, 135°, etc. Therefore, the number of antenna states of smart antenna may vary accordingly, which is not limited by the present disclosure.

Optionally, the negotiated rate refers to a data transmission rate negotiated and determined by a wireless client (STA) and a wireless access point (AP) in a Wi-Fi network while setting up a connection between them. The negotiated rate is positively correlated to the number of subcarriers, the number of coded bits per subcarrier, the number of spatial streams, and the coding rate, and is negatively correlated to symbol duration. The negotiated rate depends on the highest rate supported between client and access point, as well as signal quality and interference between them. Specifically, in a Wi-Fi network, a variety of different rates can be supported between the client and access point, which are usually called "rate set". When the client establishes a connection with the access point, they exchange the supported rate sets with each other, and then select the highest rate in their intersection set as the negotiated rate. This negotiated rate will determine the maximum transmission rate of this connection, because both parties will perform data transmission at this rate. It should be noted that the negotiated rate is not a fixed value, and it can be adjusted adaptively according to the signal quality and interference conditions. For example, if the signal quality deteriorates or the interference increases, the negotiated rate may decrease so as to guarantee the reliability of data transmission. On the contrary, if the signal quality is good, the negotiated rate may increase so as to improve the efficiency of data transmission.

Optionally, the clients communicably connected with the wireless AP may be categorized into two classes as first client and second client below. Wherein, the first client is a client connected with a wireless AP and has traffic transmission, and the second client is a client connected with a wireless AP and has no traffic transmission. With regard to the above two classes of clients, the negotiated rate is determined in different ways. Specifically, the negotiated rate of the first client (first negotiated rate) is deterministic, and can be acquired just by direct reference. The negotiated rate of the second client (second negotiated rate) is obtained by mapping historical target data. Specifically, even if there is no traffic between the second client and the wireless AP, the RSSI and rate grade of the second client can still be learned, and the negotiated rate can be obtained by mapping. When the first negotiated rate and the second negotiated rate are obtained, the negotiated rate of each client may be determined, and the negotiated rates of the plurality of clients (optionally including a first client and a second client) corresponding to the wireless AP may also be obtained.

Optionally, in the case that the negotiated rates of all clients communicably connected with the wireless AP are obtained, the performance index $S_P$ may be calculated as follows:

$$S_P = \frac{1}{N}\sum_{i=1}^{N}DR_i * w_i$$

where, $S_P$ is the weighted average of the negotiated rates corresponding to all clients communicably connected with the wireless AP, N is the number of all clients communicably connected with the wireless AP, N is a positive integer greater than 1, $DR_i$ is the negotiated rate of the ith client, and $w_i$ is the weight of the ith client.

Due to differences in client hardware, the negotiated rates between AP and terminal are graded, and different grades of clients may have different weights. Generally, the negotiated rates may be divided into three different rate grades: high, medium, and low. That is, the plurality of clients communicably connected with the wireless AP may correspond to a plurality of rate grades. Optionally, a weight of negotiated rate of each client of the plurality of clients while calculating the performance index is at least associated with a negotiated rate of the client, a received signal strength of the client, and a rate grade of the client.

Optionally, acquiring a performance index of an antenna of a wireless AP in a current antenna state further comprises: collecting target data corresponding to each clients of the plurality of clients communicably connected with the wireless AP, wherein the target data includes received signal strength, negotiated rate and rate grade. A weight of negotiated rate of each client of the plurality of clients communicably connected with the wireless AP while calculating the performance index is determined based on the target data corresponding to each client of the plurality of clients; the performance index of the antenna of the wireless AP in the current antenna state is determined based on the weight of negotiated rate of each client of the plurality of clients while calculating the performance index.

Figure 2:
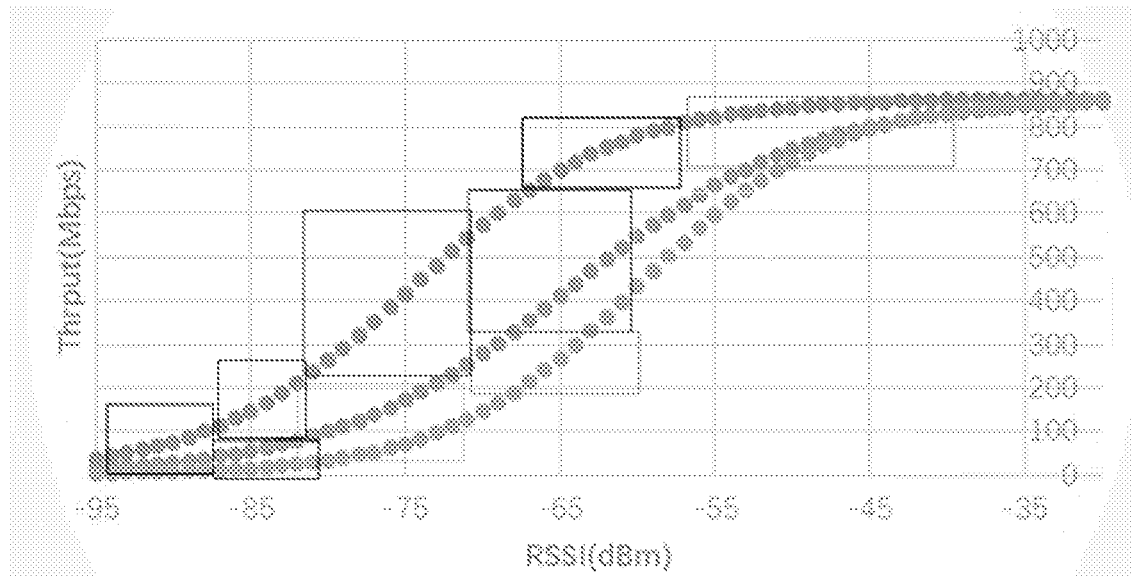
FIG. 2 is a diagram of a PAT curve provided by an embodiment of the present disclosure.

Optionally, in FIG. 2, the target data is illustrated in the form of a performance curve, wherein for the performance curve, the horizontal axis is received signal strength and the vertical axis is negotiated rate.

The weight $w_i$ of client is illustrated with reference to FIG. 2. Optionally, before operation S1001, target data (a.k.a. PAT data) may be collected corresponding to each client of the plurality of clients communicably connected with the wireless AP, wherein the target data includes received signal strength, negotiated rate and rate grade; and a plurality of weights (e.g., weight $w_i$) corresponding to the target data in a plurality of interval segments may be preset based on a curve slope corresponding to the target data. As shown in FIG. 2, it illustrates the target data corresponding to the clients with three rate grades. For the target data, the horizontal axis is received signal strength (marked as RSSI in dBm), and the vertical axis is negotiated rate (marked as Thrput (Mbps)). Indication of received signal strength may be obtained by measuring the strength of a received signal.

The target data shown in FIG. 2 is the data obtained by the AP through long-term statistics. Such data do not depend on the number of clients, but is a statistical cumulative value, which counts all the data corresponding to different rate grades of clients who have had connected with the AP under different RSSIs. The curves with different gray levels represent the target curves of different rate grades, respectively. The AP counts the target data in various rate grades.

Optionally, a two-dimensional meshing algorithm may be adopted to determine weights corresponding to respective clients based on the target data shown in FIG. 2. The principle of two-dimensional meshing is to improve the comprehensive performance based on the change of curve slope. To this end, optionally, the weights of respective clients may be positively proportional to the slope of the target data. Optionally, the slopes may be calculated in segments for each curve, that is, a curve is divided into N interval segments, and the samples belonging to the same interval segment are placed in the same box, wherein different boxes correspond to different weights $w_i$. Of course, the present disclosure is not limited to this.

In operation S1002, the antenna state of the antenna is adjusted based on the performance index of the antenna of the wireless AP in the current antenna state.

Optionally, the antenna states are multiple, and the antenna state of the antenna may be adjusted by utilizing dichotomy, so that the performance index of the antenna of the wireless AP in the adjusted antenna state is an optimal performance index among the performance indexes corresponding to the multiple antenna states. Optionally, the target performance index may be a preset value, which indicates an average level or a good level that the weighted average of negotiated rates of all clients communicably connected with the wireless AP can reach. In addition, the target performance index may also be a dynamic value, which depends on the current interference situation in the network, the number of first clients, and so on. Of course, the present disclosure is not limited to this.

Optionally, adjusting the antenna state of the antenna by utilizing dichotomy, so that the performance index of the antenna of the wireless AP in the adjusted antenna state is an optimal performance index among the performance indexes corresponding to all of the antenna states comprises: rotating, by utilizing dichotomy, the antenna of the wireless AP in a first direction so that the antenna of the wireless AP reaches the next antenna state, and determining the performance index of the antenna of the wireless AP in the next antenna state; in response to the performance index of the antenna of the wireless AP in the next antenna state being better than the performance index of the antenna of the wireless AP in the current antenna state, continuing rotating the antenna of the wireless AP in the first direction until the optimal performance index among the performance indexes corresponding to all of the antenna states is reached; and in response to the performance index of the antenna of the wireless AP in the next antenna state being worse than the performance index of the antenna of the wireless AP in the current antenna state, rotating the antenna of the wireless AP in a direction opposite to the first direction until the optimal performance index among the performance indexes corresponding to all of the antenna states is reached.

For example, in a specific embodiment utilizing dichotomy, in response to the performance index of the antenna of the wireless AP in the current antenna state being worse than the target performance index, the angle of the smart antenna may be rotated clockwise (or counterclockwise) for a certain angle, and then the performance index of the smart antenna in the adjusted antenna state may be measured. If the performance index of the smart antenna in the adjusted antenna state is improved, the angle of the smart antenna is rotated clockwise (or counterclockwise) by half of the previously rotated angle, and then the performance index of the smart antenna in the adjusted antenna state is continued to be measured. If the performance index of the smart antenna in the adjusted antenna state is not improved, the angle of the smart antenna is rotated in an opposite direction by half of the previously rotated angle, and then the performance index of the smart antenna in the adjusted antenna state is continued to be measured. The angle of the antenna may be adjusted repeatedly in the above manner until the target performance index (e.g., the optimal performance index among the performance indexes corresponding to all of the antenna states as described above) is reached or a number of adjustments reaches an upper limit.

The present disclosure measures performance of a smart antenna in an antenna state by calculating a weighted average of negotiated rates of all clients of a wireless AP corresponding to the smart antenna, so as to select an optimal antenna state. This method needs neither to take into account the adaptability and compatibility between wireless AP and terminal, nor to provide extra channel expenditure, thus avoiding the problems of high overhead for hardware power consumption and heavy burden for network, conveniently implementing smart antenna scheduling, while improving the efficiency thereof. In addition, this method not only minimizes the performance fluctuation brought by scheduling process and greatly reduces the performance impact brought by algorithm, but also adopts an algorithm with relatively low complexity, which is beneficial to real-time conducting of scheduling and can optimize to the hilt the overall performance rather than the performance of a single user.

Figure 3:
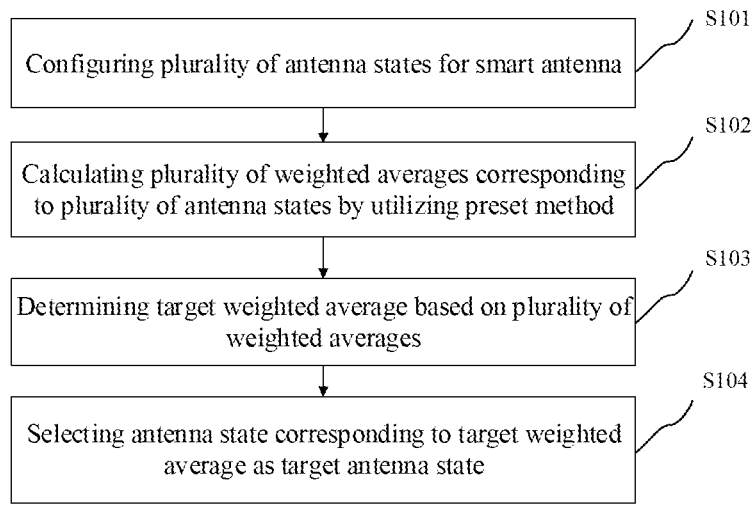
FIG. 3 is an implementation flowchart of another smart antenna scheduling method provided by an embodiment of the present disclosure.

In one embodiment, as shown in FIG. 3, there is provided another smart antenna scheduling method comprising the following steps.

In step S101, a plurality of antenna states are configured for a smart antenna.

In step S102, a plurality of weighted averages corresponding to the plurality of antenna states are calculated by utilizing a preset method. Wherein the plurality of antenna states correspond to the plurality of weighted averages one by one. Various embodiments of the present disclosure calculate a weighted average of all clients of a corresponding wireless AP by configuring a plurality of antenna states for a smart antenna and based on each of the antenna states, wherein the weighted average is weighted average of negotiated rates.

With regard to configuring a plurality of antenna states for a smart antenna, the antenna states are distinguished mainly based on the signal emitting angle of smart antenna. Specifically, it is assumed that the antenna states of smart antenna are set to a number of 8, these 8 antenna states are 8 angles arranged based on the horizontal plane and with a spacing of 45° between adjacent angles, that is, there are 8 antenna states of smart antenna based on the 8 signal emitting angles of smart antenna. In addition, regardless of the number of antenna states, the spacing between adjacent signal emitting angles should be a multiple of 45°, which may be, specifically, 90°, 135°, etc.

When the smart antenna is configured with antenna states, it is necessary to calculate a plurality of weighted averages corresponding to the plurality of antenna states by utilizing a preset method. Specifically, firstly, weighted average corresponding to each antenna state of the plurality of antenna states is calculated by utilizing the preset method, and then, the weighted average corresponding to each antenna state is collected to obtain the plurality of weighted averages.

With regard to calculating weighted average corresponding to each antenna state of the plurality of antenna states is by utilizing the preset method, specifically, a weighted average corresponding to each antenna state is calculated by switching among a plurality of antenna states and then utilizing a preset method.

With regard to switching among a plurality of antenna states, the present disclosure uses a method of dichotomy to improve the speed of antenna switching and reduce the performance fluctuation caused by the antenna switching process. It is assumed that the antenna states of smart antenna is set to a number of 8, these 8 antenna states are 8 angles arranged based on the horizontal plane and with a spacing of 45° between adjacent angles. Firstly, a weighted average of all clients of the wireless AP in the current antenna state is calculated. Then, the smart antenna is switched to each of the remaining 7 states one by one, and a weighted average of all clients of the wireless AP in each of the states is calculated respectively. As a result, the weighted average corresponding to each antenna state of the plurality of antenna states can be obtained. In addition, the preset method adopted in the present disclosure is a way to make the following function reach the optimal value by adjusting the antenna state:

$$S_{ANT} = \frac{1}{N}\sum_{i=1}^{N} DR_i * w_i$$

where, $S_{ANT}$ is the weighted average corresponding to all clients of the wireless AP, N is the number of clients accessing the wireless AP, N is a positive integer greater than 1. $DR_i$ is the negotiated rate of the i-th client, and $w_i$ is the weight of the i-th client.

It can be known based on the above formula that, to calculate the weighted average corresponding to each antenna state, it is necessary to firstly determine for each antenna state the negotiated rate and weight of each client of all clients of the wireless AP, and then to obtain the weighted average corresponding to all clients based on the negotiated rate and weight of each client, i.e., the weighted average corresponding to all clients of the wireless AP in each antenna state.

The clients corresponding to the wireless AP are categorized into two classes, namely, the first client and the second client, wherein the first client is a client connected to the wireless AP and has traffic transmission, and the second client is a client connected to the wireless AP and has no traffic transmission. For the above two classes of clients, the negotiated rate is determined in different ways. Specifically, the negotiated rate of the first client (first negotiated rate) is deterministic, and can be obtained just by direct reference. The negotiated rate of the second client (second negotiated rate) is obtained by referencing a roaming database and mapping target data in the roaming database. When the first negotiated rate and the second negotiated rate are obtained, the negotiated rate of each client may be determined, and the negotiated rates of all clients corresponding to the wireless AP may also be obtained.

After the negotiated rates of all clients corresponding to the wireless AP is calculated, it is necessary to determine the weight of each client. Specifically, firstly, the negotiated rates of each client under different signal strengths are determined based on the target data, and then, the weight of each client is determined based on the negotiated rates of each client under different signal strengths.

Further, the step of determining the weight of each client is illustrated in combination with FIG. 2. The weight wi is set according to the target data (PAT data) obtained from roaming database. Specifically, the target data is two-dimensional meshed to obtain PAT curves with comprehensive performance. Afterwards, the curve slope is calculated in segments for each of the PAT curves, that is, the curve slope is divided into N interval segments, and the part of curve slope belonging to a same interval segment are set in one box, wherein different boxes correspond to different weights wi.

Specifically, the PAT curve represents the data obtained by smart roaming of the wireless AP through long-term statistics, so it does not depend on external clients (terminals). Instead, the PAT curve is drawn by counting all terminal devices under different RSSIs (signal strengths) and different Thrput (negotiated rate) grades. The PAT curves at different positions (e.g., the 3 PAT curves from top to bottom shown in FIG. 2) characterize the PAT curves at different rate grades. Due to the differences in the hardware of the terminal devices, the negotiated rates between the AP and the terminal are graded. The AP calculates the PAT curves at various rate grades by means of intelligent roaming.

The two-dimensional meshing algorithm for the PAT curve in the above drawing is fixed, so as long as the PAT curve is fixed, the weights are fixed. The principle of PAT meshing depends on the change of curve slope. In order to improve the performance of comprehensive throughput, the interval segment with greater slope may be set with greater weight, and the interval segment with smaller slope may be set with smaller weight. Optionally, the slope may be calculated in segments for each of the PAT curves, that is, the curve slope is divided into N interval segments, and then the parts of curve slope belonging to a same interval segment in FIG. 2 are set in one box. Different boxes correspond to different weights wi. The weight wi of each client can be learned through the weights wi corresponding to different boxes.

It should be noted that the above PAT curve does not depend on the number of clients, and the data is a statistical cumulative value and is also a statistical value resulting from the smart roaming of the wireless AP. A new client will affect the PAT curve theoretically, but since the PAT data is cumulative, the accessing of few terminals has very little impact for a short time.

After determining the negotiated rate and weight of each client of all clients of the wireless AP with the above method, since the number of clients accessing the wireless AP is fixed, the weighted average corresponding to all clients can be obtained based on the number of clients and the negotiated rate and weight of each client. That is, the weighted average corresponding to all clients of the wireless AP in different antenna states may be calculated by substituting the number of clients and the negotiated rate and weight of each client into the above formula.

In Step S103, a target weighted average is determined based on the plurality of weighted averages.

In Step S104, an antenna state corresponding to the target weighted average is selected as the target antenna state.

When the plurality of weighted averages corresponding to the plurality of antenna states are obtained, in order to select the target (optimal) antenna state, it is necessary to compare the plurality of weighted averages, and select, through the comparison, the maximum value among the plurality of weighted averages as the target weighted average. With the target weighted average, the antenna state corresponding to the target weighted average can be directly found and taken as the target antenna state.

Since the weight $w_i$ of each client in the above formula is a set fixed value, it is also possible to record the negotiated rates of all clients of the wireless AP in each antenna state while switching antenna states, and to determine the target antenna state by comparing the magnitudes of the negotiated rates of all clients of the wireless AP in different antenna states.

The embodiments of the present disclosure provides a smart antenna scheduling method, comprising: configuring a plurality of antenna states for a smart antenna; calculating a plurality of weighted averages corresponding to the plurality of antenna states by utilizing a preset method; determining a target weighted average based on the plurality of weighted averages; and selecting an antenna state corresponding to the target weighted average as a target antenna state. The present disclosure measures performance of a smart antenna in an antenna state by calculating a weighted average of negotiated rates of all clients of a wireless AP corresponding to the smart antenna, so as to select an optimal antenna state (i.e., target antenna state). This method needs neither to take into account the adaptability and compatibility between wireless AP and terminal, nor to provide extra channel expenditure, thus avoiding the problems of high overhead for hardware power consumption and heavy burden for network, conveniently implementing smart antenna scheduling, while improving the efficiency thereof. In addition, this mart antenna scheduling method not only minimizes the performance fluctuation brought by scheduling process and greatly reduces the performance impact brought by algorithm, but also adopts an algorithm with relatively low complexity, which is beneficial to real-time conducting of scheduling and can optimize to the hilt the overall performance rather than the performance of a single user.

It should be understood that the sequence numbers of each step in the above embodiments do not mean the executing order, and the executing order of each process should be determined by its function and internal logic, and should not constitute any constraints on the implementation process of the disclosed embodiments.

An apparatus embodiment of the present disclosure is as follows. For details not elaborately described, please refer to the above corresponding method embodiments.

Figure 4:
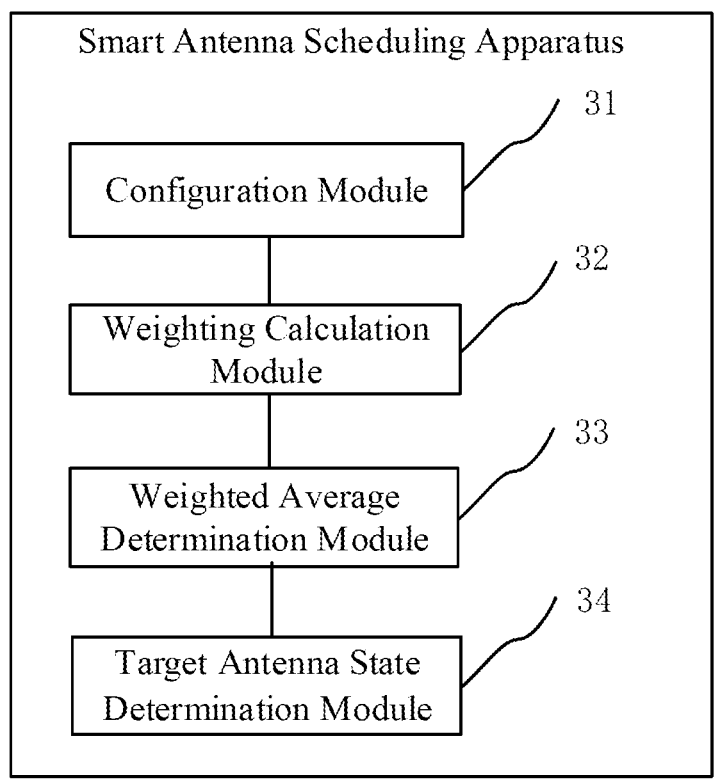
FIG. 4 is a structural diagram of a smart antenna scheduling apparatus provided by an embodiment of the present disclosure.

FIG. 4 illustrates a structural diagram of a smart antenna scheduling apparatus provided by an embodiment of the present disclosure. For convenience of illustration, only parts related to the embodiment of the present disclosure are shown. A smart antenna scheduling apparatus includes a configuration module 31, a weighting calculation module 32, a weighted average determination module 33 and a target antenna state determination module 34, as follows: a configuration module 31, for configuring a plurality of antenna states for a smart antenna; a weighting calculation module 32, for calculating a plurality of weighted averages corresponding to the plurality of antenna states by utilizing a preset method, wherein the plurality of antenna states correspond to the plurality of weighted averages one by one, and the weighted average is weighted average of negotiated rates of all clients of the wireless AP corresponding to the smart antenna; a weighted average determination module 33, for determining a target weighted average based on the plurality of weighted averages; and a target antenna state determination module 34, for selecting an antenna state corresponding to the target weighted average as the target antenna state.

In one possible implementation, the weighting calculation module 32 includes: a weighting calculation submodule, for calculating weighted average corresponding to each antenna state of a plurality of antenna states by utilizing a preset method; and a weighting summary submodule, for collecting weighted average corresponding to each antenna state to obtain a plurality of weighted averages.

In one possible implementation, the weighting calculation submodule includes: a negotiated rate calculation unit, for determining, for each antenna state, a negotiated rate of each client of all clients of the wireless AP; and a weighting calculation unit, for obtaining a weighted average corresponding to all clients based on the negotiated rate and weight of each client.

In one possible implementation, the all clients include a first client and a second client; The negotiated rate calculation unit includes: a first negotiated rate calculation subunit, for configuring a corresponding first negotiated rate for the first client; a second negotiated rate calculation subunit, for referencing a roaming database and mapping target data in the roaming database to obtain a second negotiated rate corresponding to the second client; and a negotiated rate calculation subunit, for obtaining the negotiated rate of each client based on the first negotiated rate and the second negotiated rate.

In one possible implementation, the weighting calculation unit includes: a weighting determination subunit, for determining the weight of each client; and a weighting calculation subunit, for obtaining a weighted average corresponding to all clients based on the number of clients and the negotiated rate and weight of each client.

In one possible implementation, the weighting determination subunit is specifically used for: determining the negotiated rates of each client under different signal strengths based on the target data; and determining the weight of each client based on the negotiated rates of each client under different signal strengths.

In one possible implementation, the weighted average determination module 33 includes: a weighted average determination submodule, for selecting a maximum value among the plurality of weighted averages as the target weighted average.

Figure 5:
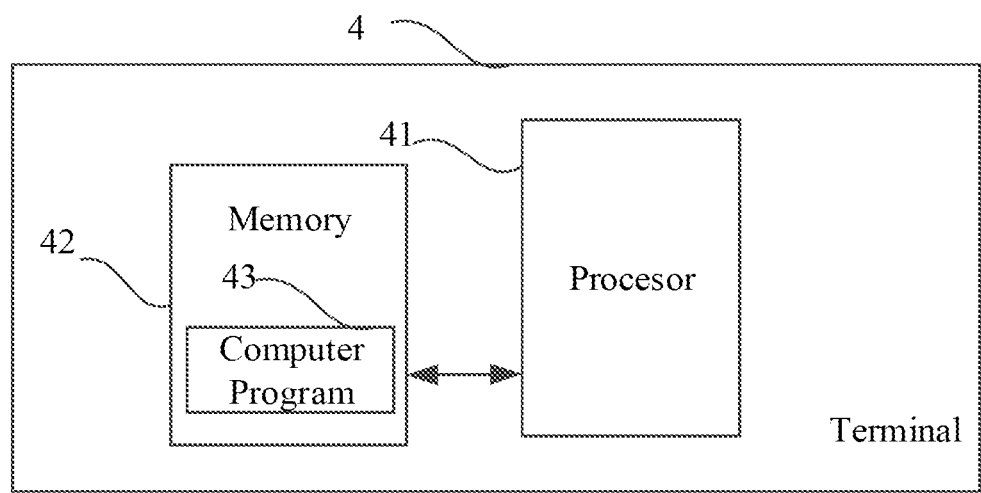
FIG. 5 is a diagram of a terminal provided by an embodiment of the present disclosure.

FIG. 5 is a diagram of a terminal provided by an embodiment of the present disclosure. As shown in FIG. 5, the terminal 4 of this embodiment includes a processor 41, a memory 42, and a computer program 43 stored in the memory 42 and executable on the processor 41. The computer program 43, when executed by the processor 41, implements the steps of each of embodiments of the above smart antenna scheduling methods, such as steps 1001 to 1002 shown in FIG. 1 or step 101 to step 104 shown in FIG. 3. Alternatively, the computer program 43, when executed by the processor 41, implements the functions of each module/unit of each of embodiments of the above smart antenna scheduling apparatus, such as the functions of modules/units 31 to 34 shown in FIG. 4.

The present disclosure further provides a readable storage medium having stored therein a computer program which, when executed by a processor, is used to implement the smart antenna scheduling methods provided by the above various implementations.

Wherein, the readable storage medium may be a computer storage medium or a communication medium. The communication media includes any media that facilitates the transfer of computer programs from one place to another. The computer storage media may be any available media that can be accessed by general-purpose or special-purpose computers. For example, a readable storage medium is coupled to a processor so that the processor can read information from and write information to the readable storage medium. Of course, the readable storage medium may also be a constituent part of the processor. The processor and the readable storage medium may be located in an application specific integrated circuit (ASIC for short). In addition, the ASIC may be located in user equipment. Of course, the processor and the readable storage medium may also be present as separate components in communication device. The readable storage medium may be read-only memory (ROM), random access memory (RAM), CD-ROM, magnetic tape, floppy disk, optical data storage device, etc.

The present disclosure further provides a program product comprising execution instructions stored in a readable storage medium. At least one processor of a device may read the execution instructions from the readable storage medium, and the at least one processor may execute the execution instructions so that the device implements the smart antenna scheduling methods provided by the above various implementations.

In the embodiment of the above device, it should be understood that the processor may be a Central Processing Unit (CPU for short), or another general processor, or Digital Signal Processor (DSP for short), or application specific integrated circuits (ASIC for short), etc. The general processor may be a microprocessor or the processor may be any conventional processor, etc. The steps of the method disclosed in connection with the present disclosure may be directly embodied in the completion of execution by a hardware processor, or the completion of execution by a combination of hardware and software modules in the processor.

The above embodiments are only used to illustrate the technical scheme of the present disclosure, but not to limit it. Although the present disclosure has been described in detail with reference to the foregoing embodiments, those skilled in the art should understand that it is still possible to make modifications to the technical schemes described in the foregoing embodiments, or make substitutions to part of the technical features with equivalents. However, such modifications or substitutions do not make the essence of the corresponding technical schemes deviate from the spirit and scope of the technical schemes of various embodiments of the present disclosure, and should be included in the protection scope of the present disclosure.

What is claimed is:

1. A method for adjusting antenna state of a wireless AP, comprising:
    acquiring a performance index of an antenna of the wireless AP in a current antenna state, wherein the performance index is a weighted average of negotiated rates of a plurality of clients communicably connected with the wireless AP; and
    adjusting the antenna state of the antenna based on the performance index of the antenna of the wireless AP in the current antenna state,
    wherein a negotiated rate between a client and the wireless AP is a data transmission rate negotiated and determined by the client and the wireless AP while setting up a connection between them,
    wherein the plurality of clients include a first client and a second client, wherein the first client is a client connected with a wireless AP and has traffic transmission, and the second client is a client connected with a wireless AP and has no traffic transmission.

2. The method according to claim 1, wherein the antenna states are multiple, and adjusting the antenna state of the antenna based on the performance index of the antenna of the wireless AP in the current antenna state further comprises:
    adjusting the antenna state of the antenna by utilizing dichotomy, so that the performance index of the antenna of the wireless AP in the adjusted antenna state is an optimal performance index among the performance indexes corresponding to the multiple antenna states.

3. The method according to claim 2, wherein adjusting the antenna state of the antenna by utilizing dichotomy, so that the performance index of the antenna of the wireless AP in the adjusted antenna state is an optimal performance index among the performance indexes corresponding to the multiple antenna states comprises:
    rotating, by utilizing dichotomy, the antenna of the wireless AP in a first direction so that the antenna of the wireless AP reaches the next antenna state, and determining the performance index of the antenna of the wireless AP in the next antenna state;
    in response to the performance index of the antenna of the wireless AP in the next antenna state being better than the performance index of the antenna of the wireless AP in the current antenna state, continuing rotating the antenna of the wireless AP in the first direction until the optimal performance index among the performance indexes corresponding to all of the antenna states is reached; and
    in response to the performance index of the antenna of the wireless AP in the next antenna state being worse than the performance index of the antenna of the wireless AP in the current antenna state, rotating the antenna of the wireless AP in a direction opposite to the first direction until the optimal performance index among the performance indexes corresponding to all of the antenna states is reached.

4. The method according to claim 1, wherein the plurality of clients communicably connected with the wireless AP correspond to a plurality of rate grades, and a weight of negotiated rate of each client of the plurality of clients while calculating the performance index is at least associated with a negotiated rate of the client, a received signal strength of the client and a rate grade of the client.

5. The method according to claim 1, further comprising:
    collecting target data corresponding to each clients of the plurality of clients communicably connected with the wireless AP, wherein the target data includes received signal strength, negotiated rate and rate grade; and presetting a plurality of weights corresponding to the target data in a plurality of interval segments based on a curve slope corresponding to the target data.

6. The method according to claim 1, wherein acquiring a performance index of an antenna of the wireless AP in a current antenna state further comprises:
determining a weight of negotiated rate of each client of the plurality of clients communicably connected with the wireless AP while calculating the performance index, based on the current target data corresponding to each client of the plurality of clients, wherein the target data includes received signal strength, negotiated rate and rate grade; and
determining the performance index of the antenna of the wireless AP in the current antenna state based on the weight of negotiated rate of each client of the plurality of clients while calculating the performance index.

7. A wireless AP, comprising a memory, a processor and a computer program stored in the memory and executable on the processor, wherein the computer program, when executed by the processor, implements the method according to claim 1.

* * * * *